(No Model.)

E. CROSBY.
SLED BRAKE.

No. 464,296. Patented Dec. 1, 1891.

ATTEST.
J. Henry Kaiser
J. A. Rutherford

INVENTOR.
Ezra Crosby
By Wm Finn
Atty.

THE NORRIS PETERS CO., PHOTO-LITHO., WASHINGTON, D. C.

UNITED STATES PATENT OFFICE.

EZRA CROSBY, OF MADISON, MAINE.

SLED-BRAKE.

SPECIFICATION forming part of Letters Patent No. 464,296, dated December 1, 1891.

Application filed August 11, 1891. Serial No. 402,332. (No model.)

*To all whom it may concern:*

Be it known that I, EZRA CROSBY, a citizen of the United States, residing at Madison, in the county of Somerset and State of Maine, have invented certain new and useful Improvements in Sled-Brakes; and I do hereby declare the following to be a full, clear, and exact description of the invention, such as will enable others skilled in the art to which it appertains to make and use the same.

This invention relates to an improved manually-operated brake for sleds or sleighs, and has for its objects to simplify the construction and reduce the cost of such devices, and, further, to provide means whereby the brake can be quickly and effectively applied when it is desired to arrest or retard the motion of the vehicle.

The invention consists in the construction, arrangement, and combination of parts in a brake for sleds or sleighs, as hereinafter more fully set forth.

Figure 1:
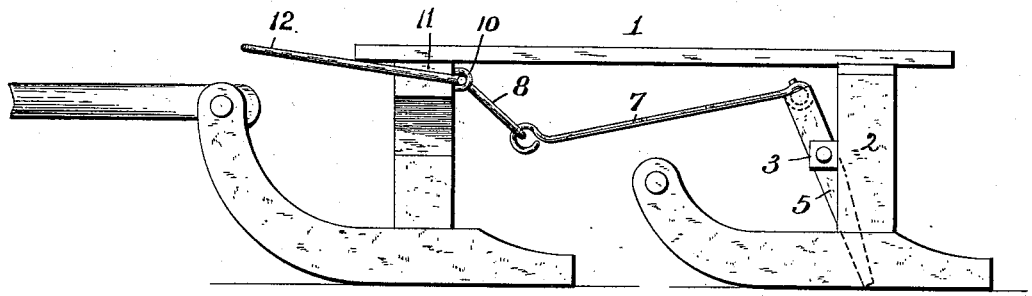
Figure 2:
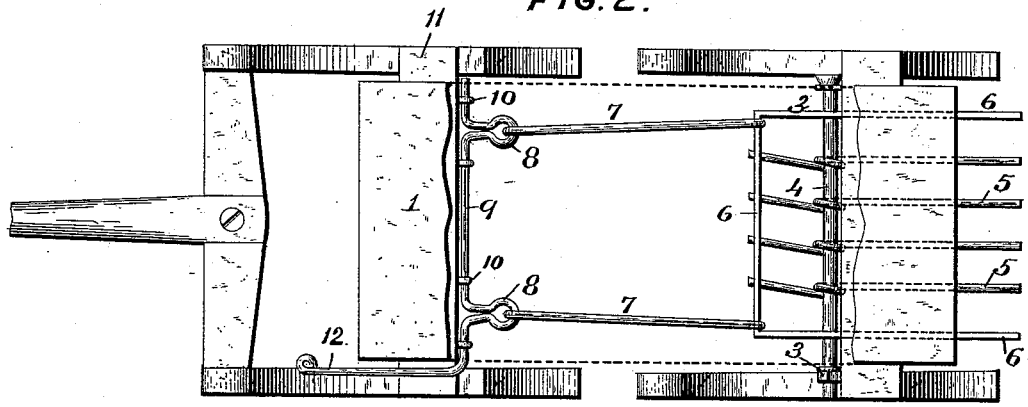
Figure 3:
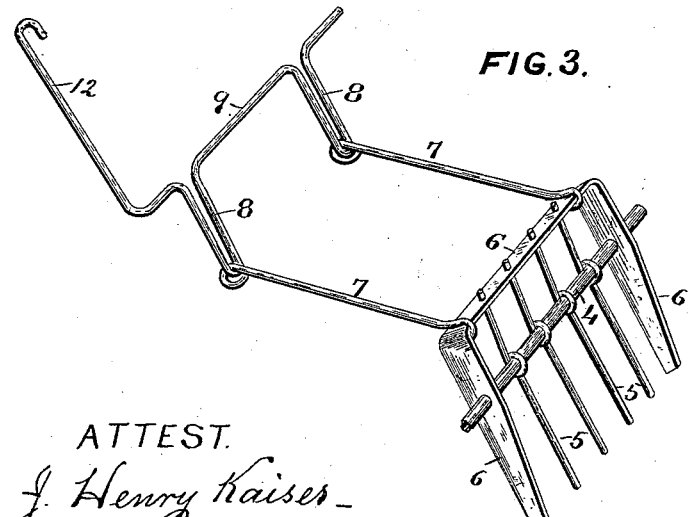

In the annexed drawings, Figure 1 is a side view of a sled provided with my improved brake. Fig. 2 is a plan of the same, a portion of the top board being broken away to show more clearly the brake and its operating connections. Fig. 3 is a view of the brake mechanism detached.

Referring to the drawings, like parts are designated by the same numerals in the several views.

The numeral 1 designates a sleigh or sled of any desired construction. To the knees 2, at or near the rear of the sled, are attached suitable boxes or supports 3 for a transverse rock-shaft 4, the ends of which are journaled in said boxes. This rock-shaft 4 supports a series of oscillatory brake-arms 5, of which the outermost ones at the opposite ends of the series may constitute also the side arms or bars of a yoke-shaped frame 6, in whose transverse bar are secured the upper ends of the intermediate brake-arms, as shown. The intermediate brake-arms are preferably partly coiled around the rock-shaft 4, as shown, or they may be secured thereto in any other appropriate manner. By securing all the brake-arms 5 to the transverse portion of the yoke-shaped frame 6, as well as the rock-shaft 4, it is obvious that considerable stiffness is imparted to the whole series of brake-arms, whereby they are better adapted to withstand the shocks and strains to which they are liable to be subjected.

To the transverse bar of the yoke-shaped frame 6 are pivotally connected the rear ends of rods 7, that are extended forward beneath the top board of the sled or the bottom of a sleigh and have their forward ends pivotally connected to crank-arms 8 on a rock-shaft 9, which is journaled in suitable boxes, eyes, or supports 10, secured to one of the cross-beams 11 of the sled or sleigh frame. A hand-lever or foot-lever 12 on one end of the rock-shaft 9 affords a convenient means for quickly imparting a rocking movement to said shaft 9, for the purpose of applying or taking off the brake, as may be required.

It will be observed that when the lever 12 is in its normally-raised position the weight of the then depending crank-arms 8 and of the transverse bar of the frame 6, together with the connecting-rods 7, will hold the brake-arms 5 normally away from the road, so that the motion of the sleigh or sled will not be impeded. Should it now be desired to arrest or retard the forward movement of the vehicle—as, for instance, in descending a hill or incline—the lever 12 may be pressed forward and downward by a movement of the hand or foot, thus rocking the shaft 9 in such direction as to carry its crank-arms 8 upward and rearward, thereby raising the rods 7 and moving them longitudinally backward, so as to elevate and force backward the transverse bar of the yoke-shaped frame 6 and cause the rear or free ends of the brake-arms 5 to come in contact with the roadway with sufficient force to enter the snow or ice and so stop the vehicle and prevent it from moving too fast. By raising or drawing backward the lever 12 the crank-arms 8 and rods 7 will be moved downward and forward, thereby raising and disengaging the brake-arms 5 from the roadway and permitting the sled or sleigh to move forward until the brake is again applied.

Although I have in the drawings shown my improved brake applied to a sled of ordinary and well-known construction, it will be obvious that it may be attached to and operated as well on a sled or sleigh of any of the usual styles, whether designed for coasting or for the attachment of draft-animals.

What I claim as my invention, and desire to secure by Letters Patent, is—

In a sled-brake, the combination of the rock-shaft 4, the brake-arms 5, and yoke-shaped frame 6, mounted on said rock-shaft, with the upper ends of the said brake-arms secured to the cross-bar of the yoke-shaped frame, the rods 7, having their rear ends pivotally connected with the yoke-shaped frame, and the rock-shaft 9, having an operating-lever 12 and provided with crank-arms 8, connected with the forward ends of said rods, substantially as shown and described.

In testimony whereof I affix my signature in presence of two witnesses.

EZRA CROSBY.

Witnesses:
BRADFORD F. LANCASTER,
MAMIE W. GREGORY.